: # 2,845,333

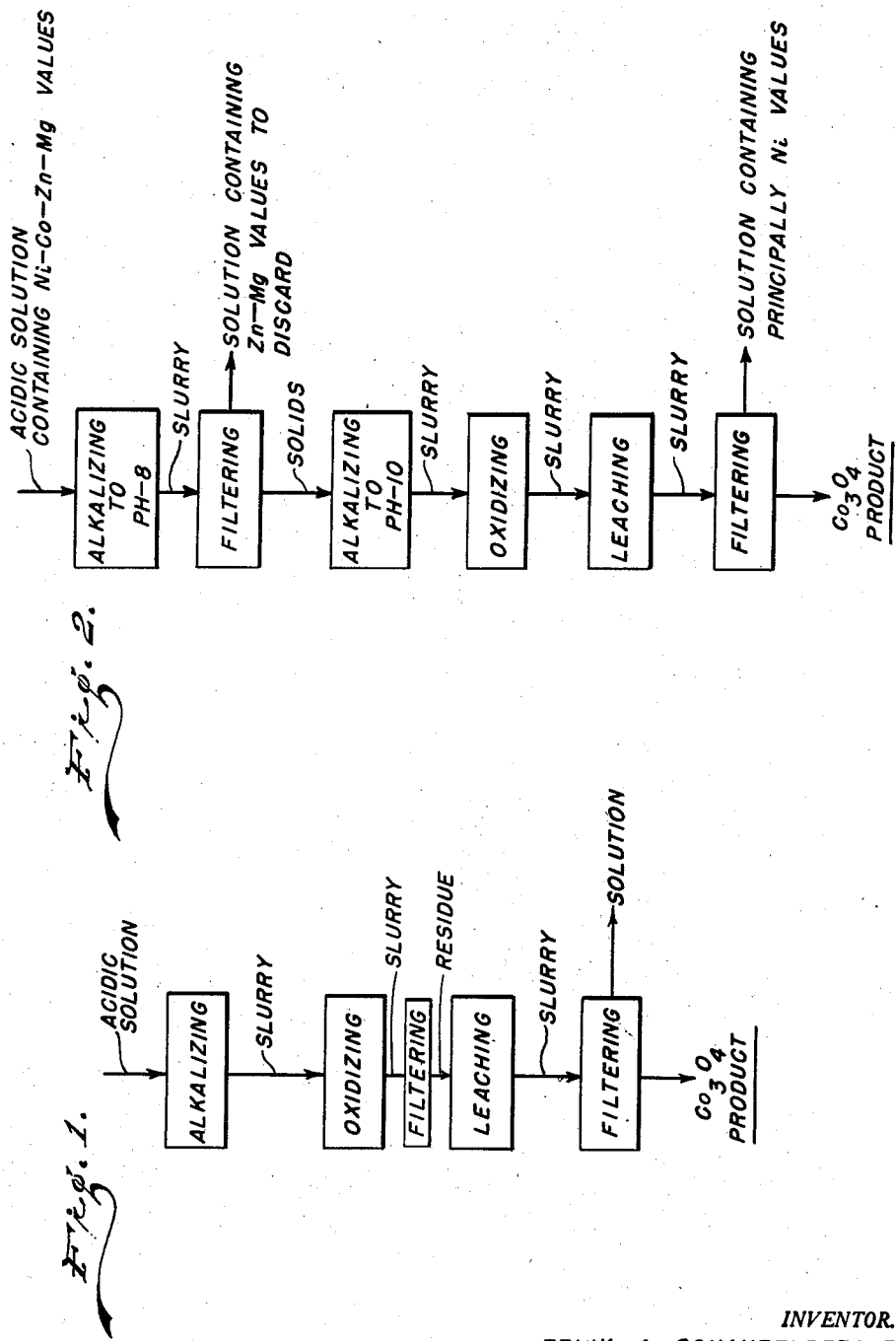

PROCESS OF SEPARATING COBALT AND NICKEL VALUES

Felix A. Schaufelberger, Rye, N. Y., assignor to Chemical Construction Corporation, New York, N. Y., a corporation of Delaware Application June 21, 1955, Serial No. 516,824

11 Claims. (Cl. 23—183)

This invention relates to the hydrometallurgy of nickel and cobalt. More specifically, it is concerned with the selective removal of substantially all the cobalt from solutions containing salts of both nickel and cobalt. Still more particularly, it involves a method whereby substantially all the cobalt content of such solutions is precipitated as a cobalt oxide, leaving a solution from which metallic nickel is easily recovered by known methods.

Nickel and cobalt metals are very similar in many physical and chemical characteristics. The same is true of their salts and naturally occurring minerals. Moreover, minerals of both generally occur together in natural deposits and usually cannot be separated by ordinary mineral dressing practices. For these reasons, both metals are generally present in varying amounts in any solution resulting from any type of leaching of materials containing cobalt and nickel.

This results in many technical and economic problems. For instance, in most ordinary practices, small amounts of cobalt present in nickel ore concentrates represent but little benefit to the nickel producer. Very little cobalt available in such materials is recovered and sold as such, primarily because by current methods, the cost of separation equals or exceeds the additional value. Much, if not most, of the cobalt is lost in the slag from nickel smelting. The remainder is sold as "nickel" in nickel metal bullion or cathodes.

Similarly, small amounts of nickel present in cobalt concentrates, and therefore in "cobalt" solutions after leaching, are of small value. It is generally either discarded, which is a considerable loss, or it is recovered with the "cobalt." In the latter case, the nickel becomes an impurity in the cobalt metal and generally the producer is not paid for it. While certain nickel and cobalt mixed metals are marketable as such, it is usually at a price below the value of the pure metals in separation products.

In conventional metallurgy of nickel and cobalt, the presence of smaller but appreciable quanitities of either in sources of the other, i. e., in ores, ore concentrates, scrap metals, plant by-products and the like, presents a serious and difficult problem. This problem has heretofore been variously attacked.

Several methods of separating nickel and cobalt from ammonium carbonate leach liquors have been proposed. Most of these involve fractional distillation of ammonium carbonate. Liquor at different stages in the process thereby becomes concentrated with either nickel or cobalt. Liquor so concentrated may then be removed and treated separately. The residue must also be redissolved and retreated separately. However, either as to processing methods or as to product metals, these are not entirely satisfactory.

In recent years, much attention has been given to the possibility of selectively reducing one of the metals from a conjoint solution of nickel and cobalt values directly to metal powder, using a suitable reducing gas. Under the proper conditions, nickel has been selectively reduced, the cobalt being retained in solution. In this manner, large quantities of nickel have been prepared. However, the degree of selectivity is affected as the amount of nickel in solution decreases and the resultant ratio of dissolved-nickel to dissolved-cobalt decreases.

Accordingly, considerable further study has been given to the possibilities of cobalt removal prior to nickel reduction, either to obtain a cobalt product or to improve the dissolved metal ratio of nickel to cobalt and thereby obtain a solution better suited to efficient selective reduction of nickel. For example, the dissolved cobalt is converted to some less soluble cobalt compound. One method for accomplishing insolubilization of cobalt compound requires, for instance, precise and careful adjustment of the solute content in a concentrated ammoniacal ammonium salt solution to retain nickel in solution. An other method employs hydrogen and requires temperatures well above 100° C. This latter technique necessitates the use of superatmospheric pressures, which in turn requires costly pressure vessels. For this reason, a process which eliminates any of these limitations is desirable. Accordingly, it is the object of the present invention to provide such a process.

To this end, an acidic solution containing cobalt, nickel, iron, manganese, and the like values is treated with an alkaline reagent to obtain a slurry of the corresponding hydroxides. This slurry is then oxidized with any oxygen-enriched gas, such as air or ozone, at a temperature above about 25° C. and not more than about 100° C., so as to effect conversion of cobaltous hydroxide which is present in the slurry to cobaltic oxide. The oxidized slurry is then preferably filtered and the residue leached with a suitable leaching agent, such as, for example, a strong ammonium salt solution, and alkali metal carbonate or a dilute mineral acid, to principally effect selective solubilization of the nickel values. In so proceeding, it has been found, for instance, that a solution originally containing a ratio of Co:Ni approximating 40:1 is altered to a ratio approximating 1:30 respectively, and that the precipitate of cobalt values is a commercially acceptable, nickel-free product. This is illustrated graphically in Fig. 1.

For instance, any solution containing cobalt values can be treated by the process of the present invention. Thus, it may be a plant by-product in leaching a nickel or cobalt concentrate. The source of the solution is not critical. Preferably, however, the starting solution should be high in cobalt values but low in nickel values. For example, such solution may contain a Co:Ni ratio of 40:1 or less of nickel. Further, such solutions are generally acidic.

The acidic solution is then treated with any water-soluble alkaline reagent. The latter is added at a rate such that a pH above about 7.5, and preferably between pH 8 and 12, is reached. However, sufficient alkaline reagent is added to insure conversion of all the metal values to metal hydroxides. The alkaline reagent includes the hydroxide of sodium, potassium, calcium, barium or the like. Due to the availability of calcium oxide and magnesium oxide, either of the latter is preferred.

It is a further feature of this present invention that the alkaline reagent may be added stepwise to a solution containing metal values in addition to the nickel and cobalt values. For example, only sufficient alkali to equal about pH 8 may be initially added. In this manner, principally nickel and cobalt hydroxides will precipitate. The precipitate consisting essentially of nickel and cobalt values is next reslurried in water, and additional alkali is added to increase its alkalinity to a pH of about 10.

This slurry is next subjected to oxidation. This modification is diagrammatically shown in Fig. 2.

It has been found that oxidation occurs when the alkalized slurry is subjected to air oxidation at temperatures up to 100° C. If desired, oxidation under superatmospheric pressure, and advantageously up to about 100 p. s. i., may be employed. The purpose of this operation is to insure the conversion of the cobalt values to the cobaltic state. Separation of cobaltic oxide takes place readily where the slurry, prior to oxidation, is maintained at pH of between 8 and 12 or higher.

The oxidized slurry is then leached, for example, at room temperature with various suitable leaching agents, such as ammoniacal ammonium sulfate, dilute mineral acid solutions, or bicarbonates. Cobaltic oxide is insoluble in the leach solution. The latter oxide is readily separated. The filtrate, containing essentially all the nickel and other metal values along with trace quantities of cobalt, is next treated for nickel recovery. This does not form a part of the invention. Cobalt metal may be recovered from the nickel-free residue by known methods which similarly do not form a part of the present invention.

The practice of the present invention and the practical limits thereof are further illustrated by the following examples. Unless otherwise noted, the parts are by weight.

*Example 1*

1000 ml. of sulfate leach solution at pH=1.5 and containing (g./l.): 10-Co, 0.25-Ni, 2-Mn, 2-Fe(II), 0.25-Zn, 7-Mg, was treated with sufficient lime (CaO) to precipitate the hydroxides of above metals at a pH 10. Resultant slurry was fed to an autoclave, heated to 80° C. while agitated, and treated with air at an over-pressure of 50 lbs. for ½ hour. The solids and liquids were then separated by filtration. The filtrate was discarded. The residue analyzing 5.0% Co and 0.14% Ni was then treated with 200 ml. of a solution containing (moles/l.): 8-$NH_3$ and 1.5-$(NH_4)_2SO_4$ at 120° C. After one hour, the nickel content of the oxidized residue had been reduced to 0.0225% Ni providing a 222:1 Co:Ni ratio in the residue. The solution contained substantially all of the nickel at a Ni:Co ratio of 30:1.

*Example 2*

Example 1 was repeated except that the sulfate leach solution was treated with sufficient lime (CaO) to reach a pH equal to 8 so as to precipitate only the nickel and cobalt values. In this instance, however, one-fifth of the total magnesium value precipitated along with the nickel and cobalt values. After filtration, the residue was slurried up again in water with additional lime added until a pH equal to 10 was reached. The thus-formed slurry was next oxidized at 100° C. at 100 p. s. i. g. air pressure for ½ hour. The oxidized residue was treated with dilute aqueous (3%) $H_2SO_4$ at 75° C. This extracted 95% of the Ni and 12% of the cobalt, leaving a residue with a Co:Ni ratio of 660:1 and a solution containing a Ni:Co ratio of 30:1.

I claim:

1. A process for treating an acidic solution containing cobalt values and a small amount of nickel values which comprises the steps of: treating said solution with sufficient alkaline reagent until a pH of at least 7.5 is reached whereby all the cobalt and nickel values are converted to their corresponding metal hydroxides and are insolubilized therein, subjecting the latter alkalized mixture to the action of an oxygen-enriched gas at a temperature ranging of from about 25° C. to about 100° C., separating the oxidized mixture to recover all the nickel and cobalt values as solids, leaching the latter solids mixture with an aqueous ammoniacal ammonium sulfate reagent to solubilize selectively the nickel values present therein, effecting separation of the thus-leached mixture to remove the remaining cobalt value as a solid, and recovering a substantially nickel-free cobalt oxide product.

2. The process according to claim 1 in which the alkaline reagent is calcium oxide.

3. The process according to claim 1 in which the alkaline reagent is magnesium oxide.

4. The process according to claim 1 in which the oxygen enriched gas is air.

5. The process according to claim 4 in which the oxidation is carried out at superatmospheric pressure.

6. In a process for treating an acidic solution containing cobalt values along with at least nickel, zinc and magnesium values which comprises the steps of: treating said solution with sufficient alkaline reagent until a pH of 8 is reached whereby all the cobalt and nickel values are insolubilized and converted to their corresponding metal hydroxides, separating the insolubilized nickel and cobalt values, including a portion of insolubilized zinc and magnesium values, from the alkalized mixture, treating the thus-separated cobalt and nickel values with aqueous alkaline reagent until a pH of 10 is reached, subjecting the latter alkalized mixture to the action of an oxygen enriched gas at a temperature ranging from about 25° C. to about 100° C., separating the oxidized mixture to recover substantially all the nickel and cobalt values as solids, leaching the latter solids mixture with a dilute mineral acid leach solution to solubilize selectively the nickel values contained therein, separating the thus-leached mixture to remove the remaining cobalt values as solids, and recovering a substantially nickel-free cobalt oxide product.

7. The process according to claim 6 in which the alkaline reagent is calcium oxide.

8. The process according to claim 6 in which the alkaline reagent is magnesium hydroxide.

9. The process according to claim 6 in which the leaching reagent is dilute sulfuric acid.

10. The process according to claim 6 in which the oxygen enriched gas is air.

11. The process according to claim 10 in which the oxidation is carried out under superatmospheric pressure.

References Cited in the file of this patent

UNITED STATES PATENTS

| | | |
|---|---|---|
| 1,596,253 | Harshaw | Aug. 17, 1926 |
| 2,531,336 | Hills et al. | Nov. 21, 1950 |

FOREIGN PATENTS

| | | |
|---|---|---|
| 4,468 | Great Britain | 1876 |
| 7,585 | Great Britain | 1891 |
| 19,035 | Great Britain | 1901 |
| 570,230 | Great Britain | June 28, 1945 |
| 570,231 | Great Britain | June 28, 1945 |
| 492,158 | Canada | Apr. 21, 1953 |